United States Patent [19]

Zamek

[11] Patent Number: 4,609,702
[45] Date of Patent: Sep. 2, 1986

[54] ETHER MODIFIED POLYESTERIMIDE RESINS

[75] Inventor: Otto S. Zamek, Schenectady, N.Y.

[73] Assignee: General Electric Company, Waterford, N.Y.

[21] Appl. No.: 790,284

[22] Filed: Oct. 22, 1985

[51] Int. Cl.$^4$ ............................................. C08G 73/16
[52] U.S. Cl. .............................. 524/317; 174/110 SR; 524/376; 524/600; 525/436; 528/125; 528/126; 528/128; 528/172; 528/185
[58] Field of Search ............... 528/185, 125, 126, 128, 528/172; 524/317, 376, 600; 525/436; 174/110 SR

[56] References Cited

U.S. PATENT DOCUMENTS

| | | | |
|---|---|---|---|
| 4,331,799 | 5/1982 | Holub et al. | 528/185 |
| 4,481,339 | 11/1984 | Bolon | 528/185 |
| 4,504,632 | 3/1985 | Holub et al. | 528/185 |

*Primary Examiner*—Lester L. Lee
*Attorney, Agent, or Firm*—Gary L. Loser

[57] ABSTRACT

Ether modified polyesterimide resins are prepared by reacting under esterimide forming conditions substantially free of inert solvents a mixture consisting essentially of:
(i) a diamine,
(ii) a carboxylic acid anhydride containing at least one additional carboxylic group,
(iii) an aromatic bis (ether anhydride) or the corresponding acid thereof,
(iv) terephthalic acid and/or isophthalic acid,
(v) a polyhydric alcohol having at least two hydroxyl groups, and
(vi) optionally, a monoether of diethylene glycol or a monoether of triethylene glycol.

20 Claims, No Drawings

ETHER MODIFIED POLYESTERIMIDE RESINS

BACKGROUND OF THE INVENTION

The present invention relates to ether modified polyesterimide resins and to substrates such as electrical conductors coated therewith. More particularly, the present invention relates to ether modified polyesterimide resins which are substantially free of inert solvents and which exhibit improved properties.

Polyesterimide resins have typically been prepared from a lower dialkyl ester of terephthalic acid or isophthalic acid, ethylene glycol, a saturated aliphatic polyhydric alcohol having at least three hydroxyl groups, a diamine, and a tricarboxylic anhydride or tetracarboxylic dianhydride which will react to produce imide groups within the polyester structure, using syntheses wherein inert solvents are employed. As used herein, "inert solvents" and terms of similar import means solvents which do not react with monomeric reactants from which polyesterimide resins are synthesized. Such syntheses have not been entirely satisfactory due to the high costs of solvents and increasingly stringent governmental regulations on emissions and disposal thereof.

Attempts to carry out such polyesterimide synthesis in the absence of inert solvents have not been completely successful due to the fact that the lower dialkyl phthalate esters undergo sublimation from the reaction mixtures, resulting in deposition of flow-hindering solid deposits in conduits provided for recovering by-product vapors released from the reacting mixtures, deviations from the preselected relative amounts of reactants in the reacting mixtures, and other problems. Moreover, in the absence of a solubilizing amount of inert solvent, rapid increases in resin viscosity in later stages of the synthesis undesirably occur. This creates additional control problems including, in some instances, gelling of the resin in the synthesis vessel.

Precopio et al., U.S. Pat. No. 2,936,296, discloses a process for preparing polyester resins from dimethyl terephthalate, ethylene glycol, and a saturated aliphatic trihydric alcohol, wherein the reaction is carried out with xylene or a similar material added to the reaction mixture for the stated purpose of preventing sublimation of the dimethyl terephthalate. As described therein, the added material takes no part in the reaction.

Meyer, U.S. Pat. No. 3,426,098, teaches the preparation of polyesterimides by reacting in an inert solvent tris (2-hydroxyethyl) isocyanurate, a polycarboxylic acid, an aromatic diamine, and an aromatic carboxylic anhydride containing at least one additional carboxyl group. According to Meyer there are usually employed about 2 moles of anhydride per mole of amine.

Payette, U.S. Pat. No. 3,567,673, teaches that polyesterimide resins can be prepared by substituting for a part of the phthalate moiety, an imide group producing constituent. This can be accomplished by including in the polyester ingredients a primary amine and a tricarboxylic anhydride or tetracarboxylic dianhydride which will react to produce imide groups within the polyester structure. Alternatively, the imide group producing material can be prepared separately by first reacting the primary amine and the anhydride to produce a diamino diacid material which can then be reacted with the other polyester ingredients. The polyesterimide ingredients are reacted in a suitable solvent such as cresylic acid, cresylic acid-phenol mixtures, and the like, with or without the addition of high boiling hydrocarbon solvents.

Keating, U.S. Pat. Nos. 4,119,605, 4,119,608 and 4,119,758, describes polyesterimide resins wherein during the formation of the polyesterimide there is employed as a reactant either an ether of the formula $RO(C_nH_{2n}O)_xH$, where R is an alkyl group of 1 to 6 carbon atoms or phenyl, n is 2 or 3 and x is 2 or 3, or the monophenyl ether of ethylene glycol or mixtures of such monoethers. It is stated therein that the use of the monoether of a glycol as a reactant which serves as a monofunctional alcohol serves to control the molecular weight and solubility of the polymer and permits the manufacture of wire enamels which contain relatively non-toxic solvents in place of phenols, and also permits the attainment of enamels having economical high solids content. While reacting the ether alcohol into the resin controls its molecular weight and improves its solubility, it also tends to reduce ultimate physical properties.

Boldebuck et al., U.S. Pat. No. 4,233,435, found that the problems associated with preparing polyesterimide resins free of inert solvents from lower dialkyl esters of terephthalic acid or isophthalic acid can be eliminated to a substantial extent by including in the reaction mixture an organic component containing monohydric alcohol functionality, for example, n-hexanol, 2-ethylhexanol, n-nonanol, n-decanol, n-dodecanol, tetrahydrofurfurol, 2-butyloctanol, tetradecanol, 2,6,8-trimethylnonane-4-ol, and the like. It is disclosed therein that suitable anhydrides for making the polyesterimides include, in some instances alone, but preferably in admixture with trimellitic anhydride, 2,2-bis[4-(3,4-dicarboxyphenoxy) phenyl] propane dianhydride; i.e. 4-BPADA, and 2,2-bis[4-(2,3-dicarboxyphenoxy) phenyl] propane dianhydride; i.e. 3-BPADA. For best results, the total weight of such anhydrides is limited to an amount corresponding to up to about 1.0 imide groups formed therefrom per total moles of the trimellitic anhydride.

Zamek, U.S. Pat. No. 4,267,231, is based on the discovery that when polyesterimide resins are prepared in the presence of a monobutyl ether of a partially linear, partially branched aliphatic diglycol having two carbon atoms in one portion and three carbon atoms in the other portion of the aliphatic chain, and in which the monohydric alcohol group is a secondary alcohol group, then there is little tendency for the glycol ether to react into the resin, and consequently the molecular weight is higher than it would be if a glycol ether of the type described in the foregoing Keating patents was employed.

Zamek et al., U.S. Pat. No. 4,269,752, is similar to the foregoing Zamek U.S. Pat. No. 4,267,231 in that it is based on the discovery that when polyesterimide resins are prepared in the presence of a monophenyl ether of a branched aliphatic glycol having at least three carbon atoms in the aliphatic chain and in which the monohydric alcohol group is a secondary alcohol group, then there is little tendency for the glycol ether to react into the resin, and the molecular weight is higher than it would be if a glycol ether of the type described in the Keating patents was employed.

Bolon et al., U.S. Pat. No. 4,307,226, teaches that polyesterimide resins which are readily soluble in solvents such as monoethers of glycols are prepared by incorporating into the preformed polyesterimide resin an effective amount of ethylene glycol. By means of a transesterification process, the ethylene glycol becomes part of the polyesterimide molecule, thereby forming a polyesterimide resin which is soluble in such solvents. As in Meyer, the molar ratio of anhydride to amine is about 2:1.

Lee and Zamek, U.S. Pat. No. 4,354,965, discloses polyetheramideimide resins prepared by polycondensation of bisphenol-A dianhydride (e.g. BPADA), a tribasic acid anhydride, a diisocyanate and/or diamine in an inert solvent.

All of the foregoing patents are incorporated by reference in their entireties into the present disclosure.

It has now been discovered that aromatic bis (ether dianhydride) modified polyesterimide resins can be prepared by a process substantially free of inert solvents so as to provide ether modified polyesterimide resins which exhibit properties substantially equivalent to polyesterimide resins prepared by processes which utilize inert solvents.

SUMMARY OF THE INVENTION

It is an object of the present invention to provide ether modified polyesterimide resins prepared by a process substantially free of inert solvents.

It is another object of the present invention to provide ether modified polyesterimide resins prepared by a process substantially free of inert solvents which exhibit properties substantially equivalent to polyesterimide resins prepared by a process which utilizes inert solvents.

Still another object of the present invention is to provide wire enamels containing the ether modified polyesterimide resins of the present invention.

It is a further object of the present invention to provide substrates such as electrical conductors having the wire enamels of the present invention cured thereon.

According to the present invention such ether modified polyesterimide resins are prepared by reacting under esterimide forming conditions substantially free of inert solvents a mixture consisting essentially of:
(i) a diamine,
(ii) a carboxylic acid anhydride containing at least one additional carboxylic group or the corresponding acid thereof,
(iii) an aromatic bis (ether anhydride) or the corresponding acid thereof,
(iv) terephthalic acid and/or isophthalic acid,
(v) a polyhydric alcohol having at least two hydroxyl groups, and
(vi) optionally, a monoether of diethylene glycol or a monoether of triethylene glycol.

DESCRIPTION OF THE INVENTION

The present invention provides ether modified polyesterimide resins prepared by reacting under esterimide forming conditions substantially free of inert solvents a mixture consisting essentially of:
(i) a diamine,
(ii) a carboxylic acid anhydride containing at least one additional carboxylic group or the corresponding acid thereof,
(iii) an aromatic bis (ether anhydride) or the corresponding acid thereof,
(iv) terephthalic acid and/or isophthalic acid,
(v) a polyhydric alcohol having at least two hydroxyl groups, and
(vi) optionally, a monoether of diethylene glycol or a monoether of triethylene glycol.

Component (i) can be any imide forming diamine or a mixture of two or more diamines. Aromatic diamines are preferred and include, for example, 4,4'-methylene dianiline, 4,4'-oxydianiline, m-phenylene diamine, benzidine, 1,4-diaminonaphthalene, xylene diamine, 3,3'-diaminodiphenyl, p-phenylene diamine, toluene diamine, 4,4'-diamino diphenylsulfone, 3,4'-diaminobenzophenone, and the like. Suitable aliphatic diamines include, for example, hexamethylene diamine, ethylene diamine, 4,4'-dicyclohexylmethane diamine, and the like. Additional diamines suitable herein are set forth in the U.S. Patents listed hereinabove. Most preferably, 4,4'-methylene dianiline is employed as component (i).

Component (ii) can be any carboxylic acid anhydride which contains at least one additional carboxylic group, or it can be the corresponding carboxylic acid containing two imide forming vicinal carboxylic groups in lieu of the anhydride group. Of course, mixtures thereof are also suitable. The additional carboxylic group must be esterifiable in order to link the polyimide with the polyester contributing portion of the esterimide resin. The preferred component (ii) is trimellitic anhydride or trimellitic acid.

Component (iii) can be any aromatic bis (ether anhydride) or the corresponding tetracarboxylic acid effective for imparting improved properties to conventional polyester resins prepared by a process substantially free of inert solvents. Preferably, the aromatic bis (ether anhydrides) used in practicing the present invention have the general formula

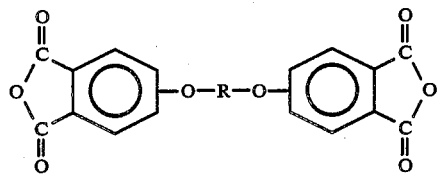

where (A) R is a radical of the formula

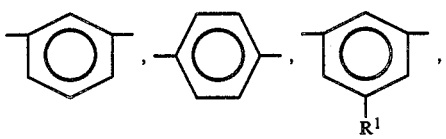

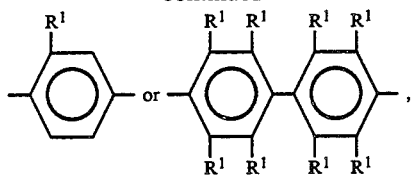

where each $R^1$ is an independently selected lower alkyl radical, a halogen atom, or a hydrogen atom; or (B) R is a radical of the formula:

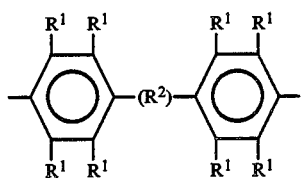

where $R^1$ is as previously defined and $R^2$ is selected from the group consisting of

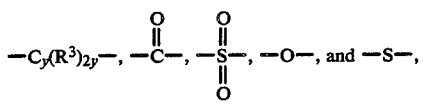

where y is an integer from 1 to 4 and $R^3$ is hydrogen, a lower alkyl radical or a mixture thereof. Preferably, $R^2$ is

so that the preferred dianhydride is

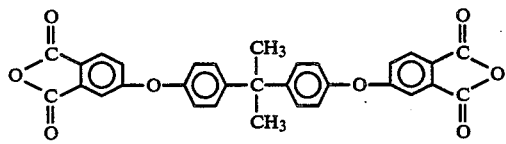

The corresponding tetracarboxylic acid would have the formula

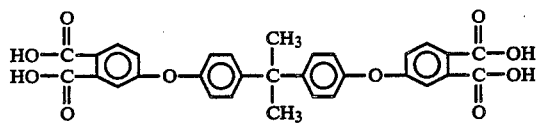

Other aromatic bis (ether anhydrides) suitable for use in the present invention include for example, 2,2-bis [4-(2,3-dicarboxyphenoxy) phenyl] propane dianhydride;
4,4'-bis (2,3-dicarboxyphenoxy) diphenyl ether dianhydride;
1,3-bis (2,3-dicarboxyphenoxy) benzene dianhydride;
4,4'-bis (2,3-dicarboxyphenoxy) diphenyl sulfide dianhydride;
1,4-bis (2,3-dicarboxyphenoxy) benzene dianhydride;
4,4'-bis (2,3-dicarboxyphenoxy) diphenylsulfone dianhydride;
2,2-bis [4-(3,4-dicarboxyphenoxy) phenyl] propane dianhydride;
4,4'-bis (3,4-dicarboxyphenoxy) diphenyl ether dianhydride;
4,4'-bis (3,4-dicarboxyphenoxy) diphenyl sulfide dianhydride;
1,3-bis (3,4-dicarboxyphenoxy) benzene dianhydride;
1,4-bis (3,4-dicarboxyphenoxy) benzene dianhydride;
4,4'-bis (3,4-dicarboxyphenoxy) diphenylsulfone dianhydride;
4—(2,3-dicarboxyphenoxy)—4'—(3,4-dicarboxyphenoxy)-diphenyl-2,2-propane dianhydride, and
3,3, bis (3,4'-dicarboxyphenoxy) diphenyl ether dianhydride.

For additional details the reader is referred to U.S. Pat. No. 3,972,902, assigned to the same assignee as the present invention and incorporated herein by reference. Other suitable aromatic bis (ether dianhydrides) will be obvious to those skilled in the art or they can be ascertained without undue experimentation.

Diamine component (i) and carboxylic acid anhydride component (ii) are preferably included in a ratio of from about 1 to about 2 moles of component (i) per mole of component (ii). The aromatic bis (ether anhydride) component (iii) is preferably included in an amount of from about 0.05 to about 0.5 moles per mole of carboxylic acid anhydride.

Components (i), (ii) and (iii) can be prereacted to form a diamino diacid material which can then be reacted with the other polyester ingredients, or they can simply be included in the reaction mixture with the polyester ingredients.

Component (iv) can be terephthalic acid, isophthalic acid, or a mixture thereof. It has unexpectedly been found that by employing the acid rather than a lower dialkyl ester thereof in the process of the present invention the problem of sublimation is obviated, hence the need for a solvent, whether inert or reactive, is eliminated. For convenience, however, it is often desirable to employ a reactive solvent such as, for example, diethylene glycol mono-n-butyl ether.

Component (v) can be any polyhydric alcohol containing at least two hydroxyl groups or a mixture of such polyhydric alcohols. Illustrative of suitable polyhydric alcohols having at least three hydroxyl groups are tris (2-hydroxyethyl) isocyanurate (e.g. THEIC); glycerin; 1,1,1-trimethylol ethane; 1,1,1-trimethylolpropane; sorbitol; mannitol; pentaerythritol; and the like. Preferably, THEIC or glycerin is used.

Component (v) can also be any aliphatic diol or a mixture of such diols. Suitable diols for use herein include, for example, ethylene glycol, propylene glycol, 1,4-butane diol, 1,5-pentane diol, 1,6-hexane diol, neopentyl glycol and the like. Preferably ethylene glycol is utilized.

Components (iv) and (v) are used in conventional amounts and preferably component (v) is a mixture of a polyhydric alcohol having at least three hydroxyl groups and an aliphatic diol.

Optional component (vi) is a monoether of diethylene glycol or a monoether of triethylene glycol. The presence of bis aromatic (ether anhydride) component (iii) allows the use of such monoether glycols without sacrificing the final properties of the cured wire enamel. If employed, the monoether glycol is preferably present in an amount of from about 10 to about 30 parts by weight per 100 parts by weight of the total composition.

The ether modified polyester resins of the present invention can include any additional components typically included by those skilled in the art. Thus, for example, there may be included an alkyl titanate catalyst such as tetraisopropyl titanate, tetramethyl titanate, tetrabutyl titanate, tetraoctyl titanate, and the like. Tetraisopropyl titanate is preferred.

Coating compositions (e.g. wire enamels) are prepared by adding a suitable solvent to the ether modified polyesterimide resins of the present invention after the reaction mixture has cooled somewhat. While a number of suitable solvents will suggest themselves to those skilled in the art, it is preferred that the solvent comprise a monoether of diethylene glycol or a monoether of triethylene glycol. In another preferred embodiment a cosolvent can be used such as, for example, N-methyl pyrrolidone, an aliphatic hydrocrabon, or an aromatic naphtha such as Solvesso-100. In an especially preferred embodiment a mixture of diethylene glycol monomethyl ether and Solvesso-100 is employed.

Preferably, there is included in the coating composition an effective amount of crosslinking agent, for example, as described in U.S. Pat. No. 2,952,665 to Bunge et al., which is incorporated by reference into the present disclosure. Mondur ® SH has been found to be an especially suitable crosslinking agent. There is also desirably added an additional amount of the previously described titanate catalyst to the coating composition.

The coating compositions can be applied to a variety of substrates, for example, an electrical conductor, in conventional fashion. Wire speeds of 15 to 65 feet per minute can be used with wire tower temperatures of from 250° F. to 800° F. The build up of coating on the wire can be increased by repetitive passes through the enamel. Alternatively, the coating solution can be applied to other substrates requiring a protective coating by dipping, brushing, spraying, wiping, and the like, and thereafter heating the coated substrate to evaporate the solvent and effect crosslinking.

In order to better enable the artisan to practice the present invention the following examples are provided by way of illustration and not by way of limitation. All parts and percentages are by weight unless otherwise noted.

EXAMPLE

A wire enamel was prepared by charging a suitable flask with the following reactants:

| | grams |
|---|---|
| ethylene glycol | 210 |
| terephthalic acid | 710 |
| trimellitic anhydride | 290 |
| methylene dianiline | 300 |
| tris (2-hydroxyethyl) isocyanurate | 820 |
| bisphenol-A dianhydride | 390 |
| tetraisopropyl titanate | 5 |

-continued

| | grams |
|---|---|
| diethylene glycol mono n-butyl ether | 480 |

The mixture was heated slowly, with the evolution of water, to a maximum temperature of 218° C. When no more water was evolved a clear resin of acid number 0.4 was obtained.

The batch was cooled below 200° C. and 510 grams Solvesso-100 and 1530 grams diethylene glycol monomethyl ether was added. The enamel solution had a solids content of 50.4%. To 1400 grams of this solution was added 40 grams Mondur SH, 17 grams tetraisopropyl titanate, 125 grams diethylene glycol monomethyl ether, and 40 grams Solvesso-100. The resultant crystal clear solution had a viscosity of 1050 centipoise at 25° C. and a solids content of 43.9%.

The enamel was applied to 18 AWG copper wire at 50 feet per minute in a conventional wire tower. The following results were obtained:

| Surface Appearance | Good |
|---|---|
| Flexibility (25% + ?) | 1X |
| Dissipation Factor (220° C.) | 3.2 |
| Solvent Resistance | Pass |
| (1/1 toluene/alcohol) | |
| Cut Thru (°C., 2000 gm) | 362 |
| Heat Shock | 2X |
| (0%, 30 min. at 200° C.) | |
| Dielectric Strength (KV) | 12.7 |
| Heat Age | 1X |
| (0%, 21 hr at 175° C.) | |
| Abrasion (Single Scrape) | 1438 |

I claim:

1. An ether modified polyesterimide resin composition prepared by reacting under esterimide forming conditions substantially free of inert solvents a mixture consisting essentially of:
   (i) a diamine,
   (ii) a carboxylic acid anhydride containing at least one additional carboxylic group or the corresponding acid thereof,
   (iii) an aromatic bis (ether anhydride) or the corresponding acid thereof,
   (iv) terephthalic acid and/or isophthalic acid, and
   (v) a polyhydric alcohol having at least two hydroxyl groups.

2. A composition as in claim 1, wherein the mixture further consists essentially of a monoether of diethylene glycol or a monoether of triethylene glycol.

3. A composition as in claim 1, wherein the component (i) diamine is an aromatic diamine.

4. A composition as in claim 3, wherein the component (ii) carboxylic acid anhydride is trimellitic anhydride.

5. A composition as in claim 1, wherein the component (iii) aromatic bis (ether anhydride) has the general formula

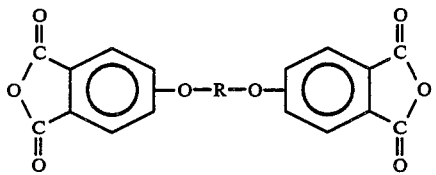

where (A) R is a radical of the formula

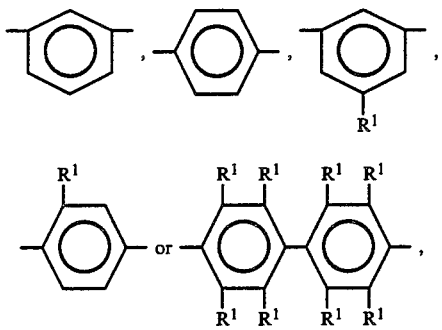

where each $R^1$ is an independently selected lower alkyl radical, a halogen atom, or a hydrogen atom; or (B) R is a radical of the formula:

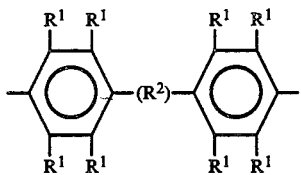

where $R^1$ is an independently selected lower alkyl radical, a halogen atom, or a hydrogen atom, and $R^2$ is selected from the group consisting of

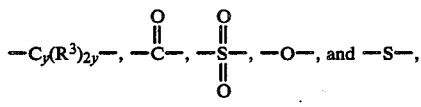

where y is an integer from 1 to 4 and $R^3$ is hydrogen, a lower alkyl radical or a mixture thereof.

6. A composition as in claim 1, wherein the component (iii) aromatic bis (ether anhydride) is

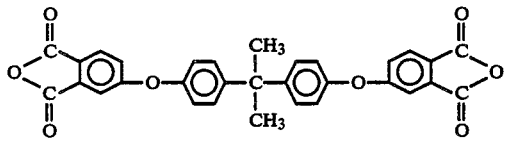

7. A composition as in claim 1, wherein the molar ratio of diamine component (i) to carboxylic acid anhydride component (ii) is from about 1 to about 2:1, and wherein the aromatic bis (ether anhydride) component (iii) is present in an amount of from about 0.05 to about 0.5 moles per mole of carboxylic acid anhydride.

8. A composition as in claim 7, wherein the component (i) diamine is an aromatic diamine, the component (ii) carboxylic acid anhydride is trimellitic anhydride, the aromatic bis (ether anhydride) component (iii) is bisphenol—A dianhydride, and the component (v) polyhydric alcohol containing at least two hydroxyl groups is a mixture of tris (2-hydroxyethyl) isocyanurate and ethylene glycol.

9. A composition as in claim 8, wherein the mixture further consists essentially of from about 10 to about 30 parts by weight per 100 parts by weight of the total composition of a monoether of diethylene glycol or a monoether of triethylene glycol.

10. A composition as in claim 1, wherein the mixture further consists essentially of an alkyl titanate.

11. A method for preparing an ether modified polyesterimide resin composition, comprising reacting under esterimide forming conditions substantially free of inert solvent a mixture consisting essentially of:
(i) a diamine,
(ii) a carboxylic acid anhydride containing at least one additional carboxylic group or the corresponding acid thereof,
(iii) an aromatic bis (ether anhydride) or the corresponding acid thereof,
(iv) terephthalic acid and/or isophthalic acid, and
(v) a polyhydric alcohol having at least two hydroxyl groups.

12. A coating composition comprising an ether modified polyesterimide resin as defined in claim 1 dissolved in a suitable solvent.

13. A coating composition as in claim 12, wherein the solvent comprises a monoether of diethylene glycol or a monoether of triethylene glycol.

14. A coating composition as in claim 12, wherein the solvent comprises a mixture of diethylene glycol monomethyl ether and an aromatic naphtha.

15. A coating composition as in claim 12, further comprising a crosslinking agent.

16. A coating composition as in claim 15, wherein the crosslinking agent is a blocked isocyanurate.

17. An article comprising a substrate having a protective resin coating thereon, said resin being as defined in claim 1.

18. An article as in claim 17, wherein the substrate is an electrical conductor.

19. An article as in claim 18, wherein the protective resin coating is as defined in claim 5.

20. An article as in claim 18, wherein the protective resin coating is as defined in claim 8.

* * * * *